(12) United States Patent
Yoshikawa et al.

(10) Patent No.: US 7,784,865 B2
(45) Date of Patent: *Aug. 31, 2010

(54) VEHICLE SEAT, MOTOR VEHICLE, AND AIRBAG MODULE

(75) Inventors: Hiromichi Yoshikawa, Minato-Ku (JP); Teruhiko Hiruta, Minato-Ku (JP)

(73) Assignee: Takata Corporation, Tokyo (JP)

( * ) Notice: Subject to any disclaimer, the term of this patent is extended or adjusted under 35 U.S.C. 154(b) by 616 days.

This patent is subject to a terminal disclaimer.

(21) Appl. No.: 11/678,210

(22) Filed: Feb. 23, 2007

(65) Prior Publication Data
US 2007/0205588 A1 Sep. 6, 2007

(30) Foreign Application Priority Data
Mar. 2, 2006 (JP) ............... 2006-056991

(51) Int. Cl.
B60R 21/207 (2006.01)
(52) U.S. Cl. ................. 297/216.1; 280/730.1
(58) Field of Classification Search ............. 297/216.1, 297/284.11; 280/728.2, 730.1, 743.1
See application file for complete search history.

(56) References Cited
U.S. PATENT DOCUMENTS 4,746,168 A * 5/1988 Bracesco ................. 297/440.2
6,752,454 B2 * 6/2004 Ruel et al. ............... 297/216.1
6,935,684 B2 * 8/2005 Sakai ....................... 297/216.1
7,306,257 B2 * 12/2007 Yoshikawa et al. ....... 297/216.1
7,559,605 B2 * 7/2009 Yoshikawa et al. ....... 297/216.1
2005/0173899 A1 * 8/2005 Korechika ............... 280/730.1
2006/0017266 A1 * 1/2006 Yoshikawa et al. ....... 280/730.1

FOREIGN PATENT DOCUMENTS

| EP | 1510420 | 3/2005 |
| EP | 1520753 | 4/2005 |
| EP | 1623887 | 2/2006 |
| JP | 5-229378 | 9/1993 |
| JP | 2005126051 | 5/2005 |

OTHER PUBLICATIONS

European Search Report dated Jan. 4, 2008 relating to corresponding European Patent Application No. 07103315.3-2424.

* cited by examiner

*Primary Examiner*—Peter R. Brown
(74) *Attorney, Agent, or Firm*—Fitch, Even, Tabin & Flannery

(57) ABSTRACT

A technology is provided effective for aiming at improving an assembling capability of an airbag module in a vehicle seat, on which an airbag module is mounted having a construction in which an airbag is developed and expanded from a downside to an upside of the seat cushion, against a movement of the vehicle occupant in a front of the motor vehicle, in a condition of the occupant being seated in the vehicle seat, at a time when an accident occurs. A vehicle seat with respect to the present invention is constructed such that a hollow portion that is caved downward, which is provided in a seat pan is capable of holding an airbag module.

13 Claims, 11 Drawing Sheets

VEHICLE SEAT, MOTOR VEHICLE, AND AIRBAG MODULE

FIELD OF THE INVENTION

The present invention relates to a vehicle seat, and more in detail, to a construction technology for a vehicle seat, on which an airbag module having a construction in which an airbag is developed and expanded from a downside to an upside of a seat cushion against movement of a vehicle occupant toward a front side of the motor vehicle in a seating condition of the vehicle occupant in a vehicle seat when an accident occurs, is mounted.

BACKGROUND OF THE INVENTION

Hitherto, in a seatbelt-wearing condition in which a seatbelt is worn by a vehicle occupant seated in a vehicle seat, various technologies for blocking occurrence of a phenomenon, i.e., a so-called submarine phenomenon, in which the vehicle occupant has a behavior to slip through a downside of a seatbelt along a seat surface, along with a frontward movement of a waist portion of the vehicle occupant when an accident occurs, is proposed. For example, in Japanese Unexamined Patent Application Publication No. 5-229378, a vehicle seat having a construction in which an expanded airbag compresses a seat cushion from below so as to block the movement of the vehicle occupant toward a front side of the motor vehicle at the time of occurrence of the accident is disclosed. However, in designing such a kind of vehicle seat, there is a demand, specifically, for a technology to construct a vehicle seat effective for aiming at improving an assembling capability of an airbag module.

Accordingly, it is a problem in the present invention to provide a technology effective for aiming at improving an assembling capability of an airbag module in a vehicle seat on which an airbag module having a construction in which an airbag is developed and expanded from a downside to an upside of a seat cushion against movement of a vehicle occupant in a seating condition in a vehicle seat toward a front side of the motor vehicle when an accident occurs, is mounted.

SUMMARY OF THE INVENTION

To solve the aforementioned problems, the present invention is constructed. Incidentally, the present invention can be applied to a construction technology for a vehicle seat mounted on various kinds of motor vehicles, such as automobile motor vehicles, trucks, buses, electric trains, boats and ships, and so fourth.

The first form of the present invention for solving the aforementioned problems is a vehicle seat mounted on a motor vehicle, and constructed to be provided with at least a left side frame, a right side frame, a seat pan, an airbag module, and a fixing member.

The left side frame according to the present invention is configured to be a seat frame component extending in a front and back direction at a left side below a seat cushion in a seat frame forming a skeleton of the seat. The right side frame according to the present invention is configured to be a seat frame component extending in a front and back direction at a right side below the seat cushion in the seat frame forming the skeleton of the seat.

A seat pan according to the present invention is configured to have a construction being disposed between the left side frame and the right side frame below the seat cushion, and including a hollow portion that is concaved downward. The "seat pan" according to the present invention refers to a member constituting a seat bottom surface of the vehicle seat, and specifically, can also be defined as a seat cushion panel, a seat cushion frame, or a seat cushion board each receiving the seat cushion. In the present invention, the hollow portion provided in the seat pan is configured to be able to hold the airbag module. With regard to a disposition of the seat pan, it is sufficient that entire, or a part of the seat pan is disposed between the left side frame and the right side frame. A construction in which the seat pan is fixed to the left side frame and the right side frame by welding, fastening with a bolt and nut, or the like in a manner so as to be hung across, or a construction in which the seat pan is fixed to a member situated between the left side frame and the right side frame by welding, fastening with a bolt and nut, or the like, can be adopted.

The airbag module in the present invention is constructed to include an airbag, to be held by the hollow portion of the seat pan, and to be set to be such that the airbag is developed and expanded from a downside to an upside of a seat cushion against forward movement of a vehicle occupant in a seating condition in a vehicle seat toward a front side of a motor vehicle when an accident occurs. Typically, the airbag module is mainly constructed with the airbag being folded back in a predetermined folding configuration and housed, a gas-supplying portion for generating airbag-expansion gas and supplying the gas into the airbag when the accident occurs, a retainer for housing the gas-supplying portion. The airbag module can sometimes be also called as an "airbag apparatus" or an "occupant restraint apparatus".

The fixing member in the present invention is constructed to be a member for fixing the airbag module held by the hollow portion of the seat pan to the seat pan side. Typically, fixing operation is enabled by using a fastening operation by a bolt and a nut, a swaging operation by a rivet, and so forth.

With respect to the first form of the invention, since the airbag module can be easily introduced into and held by the hollow portion along a concaved shape of the hollow portion provided in the seat pan, an assembling capability of the airbag module can be aimed at improving.

The second form of the present invention for solving the aforementioned problems is a vehicle seat is provided with a step portion and a discriminating mechanism.

The step portion in the present invention is constructed as a step portion having a difference of elevation in relation to an upper and lower direction is applied between the hollow portion and an outside area of the hollow portion.

The discriminating mechanism in the present invention is configured to be a mechanism in which a protrusion of the airbag module toward an outside area can be discriminated on the basis of a result of a visible confirmation between a first condition in which the airbag module held by the hollow portion covers the step portion and a second condition in which the covering operation is released. That is, a case in which an entire step portion or a part of the step portion cannot be visibly confirmed represents the first condition in which the airbag module covers the step portion, and this results in that a rear end surface of the airbag module is discriminated to protrude out to the outside area across the step portion. At this moment, the airbag module can be judged not to be located at a proper position. On the other hand, a case in which the entire step portion can be visibly confirmed represents the second condition in which the airbag module does not cover the step portion, and this results in that the rear end surface of the airbag module is discriminated not to protrude out to the outside area across the step portion. At this moment, the airbag module can be judged to be located at the proper position. By discriminating the protrusion of the airbag module toward the outside area, it is enabled to prevent the airbag module from being pinched by an airbag cover or the like.

According to such a construction, a rational vehicle seat using a step portion for discriminating a protrusion of the airbag module is provided.

The third form of the present invention for solving the aforementioned problems is the vehicle seat having the airbag module according to the second form including at least includes an airbag, a gas-supplying portion, a retainer, and a fixing bolt. The gas-supplying portion in the present invention has a function for generating airbag-expansion gas and supplying the gas into the airbag when an accident occurs. The gas-supplying portion is housed in the retainer in the present invention. The fixing bolt in the present invention is attached to the retainer and constitutes a fixing member. The fixing bolt may be integrally fixed to the retainer, or may be attached to the retainer in a separate body condition. Further, in the present invention, the step portion is defined as a pivot fulcrum for the airbag module when the airbag module held by the hollow portion is rotated toward a to-be-fixed portion at the seat pan side and the fixing bolt is fastened to the to-be-fixed portion. The to-be-fixed portion at the seat pan side is constituted by a nut to be screwed with the fixing bolt, or a member to which the nut is attached.

According to such a construction, it is enabled to aim at improving an assembling capability of the airbag module. This is because the positioning of the airbag module is performed by causing the airbag module to come into contact with the step portion from beginning to end during the time until the airbag module is fastened to the seat pan side by means of the fixing bolt.

The fourth form of the present invention for solving the aforementioned problems is the vehicle seat including a bracket in the seat frame for connecting the left side frame and the right side frame below the hollow portion in the construction according to any one of the first through fourth forms. The bracket in the present invention is configured to be a seat frame component for connecting the left side frame and the right side frame below the hollow portion in the seat frame forming a skeleton of the seat. The bracket and the left side frame, and the bracket and the right side frame are typically, connected by welding, or fastening with a bolt and a nut. Further, the pressure caused at the time when the airbag is developed and expanded when an accident occurs is constructed to be received by the seat pan and the bracket positioned below the seat pan and the hollow portion. With regard to a relative relationship between the bracket and the hollow portion, a first construction in which the pressure caused at the time when the airbag is developed and expanded is extended into the bracket by that the hollow portion in a condition of being spaced apart from the bracket comes into contact with the bracket at the time when the airbag is developed and expanded, a second construction in which the pressure caused at the time when the airbag is developed and expanded is extended into the bracket by means of that the hollow portion in a condition of being non-jointing and in contact with the bracket presses the bracket at the time when the airbag is developed and expanded, and a third construction in which the pressure caused at the time when the airbag is developed and expanded is extended into the bracket due to that the hollow portion in a condition of being jointing and in contact with the bracket presses the bracket at the time when the airbag is developed and expanded, can also adopted.

According to such a construction, since the pressure caused at the time when the airbag is developed and expanded is extended into the bracket from the hollow portion of the seat pan, strength of the vehicle seat can be secured by cooperative operation of the seat pan and the bracket, while aiming at performing weight saving.

The fifth form of the present invention for solving the aforementioned problems is a motor vehicle that at least includes a vehicle seat according to any one of the first through fourth forms and a seat belt for restraining a vehicle occupant seated in the vehicle seat. Further, the airbag module mounted on the vehicle seat blocks an occurrence of a phenomenon, namely a so-called "submarine phenomenon", which is a movement of the vehicle occupant to slip through a downside of the seat belt along a seat surface, along with a forward movement of a waist portion of the vehicle occupant when the accident occurs, in a seat belt wearing condition in which the seat belt is worn by the vehicle occupant seated in the vehicle seat.

Therefore, in accordance with the invention according to the fifth form, a motor vehicle capable of aiming at improving an assembling capability of the airbag module is provided.

The sixth form of the present invention for solving the aforementioned problems is an airbag module provided with a construction substantially similar to the airbag module serving as a component of the vehicle seat according to the first form.

Therefore, in accordance with the invention according to the sixth form, it is enabled to aim at improving the assembling capability of the airbag module.

The seventh form of the present invention for solving the aforementioned problems is an airbag module provided with a construction substantially similar to the airbag module serving as a component of the vehicle seat according to the third form.

Therefore, in accordance with the invention according to the seventh form, it is enabled to aim at improving the assembling capability of the airbag module.

As described above, according to the present invention, in a vehicle seat where an airbag module having a construction in which the airbag is developed and expanded from a downside to an upside of a seat cushion against a forward movement of a vehicle occupant seated in a vehicle seat toward a front side of a motor vehicle when an accident occurs is mounted, it is enabled to aim at improving an assembling capability of the airbag module by adopting, specifically, a construction in which a downwardly concaved hollow portion provided in a seat pan is capable of holding the airbag module.

DETAILED DESCRIPTION OF THE PREFERRED EMBODIMENTS

Figure 1:
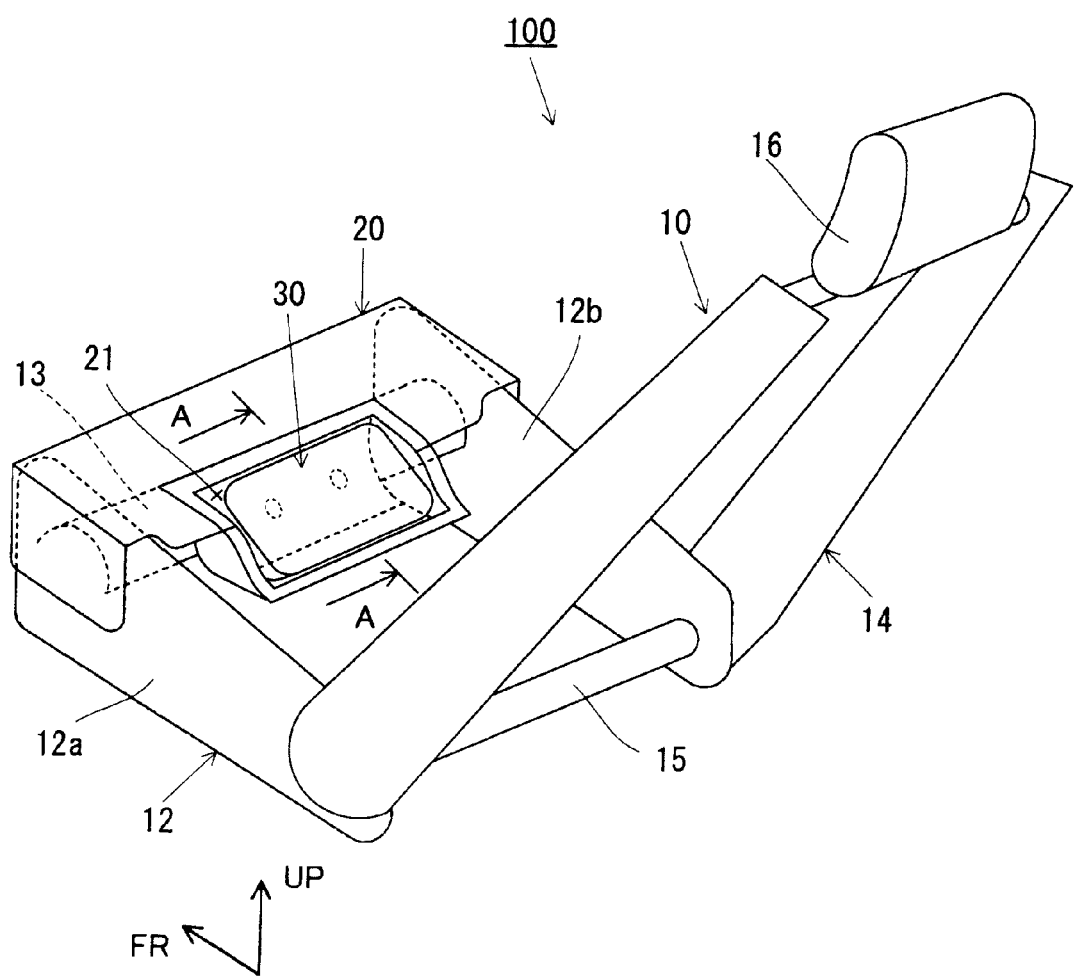
FIG. 1 is a view showing an internal structure of a vehicle seat 100 in the present embodiment and is a perspective view looking from diagonal backside of the motor vehicle.
Figure 2:
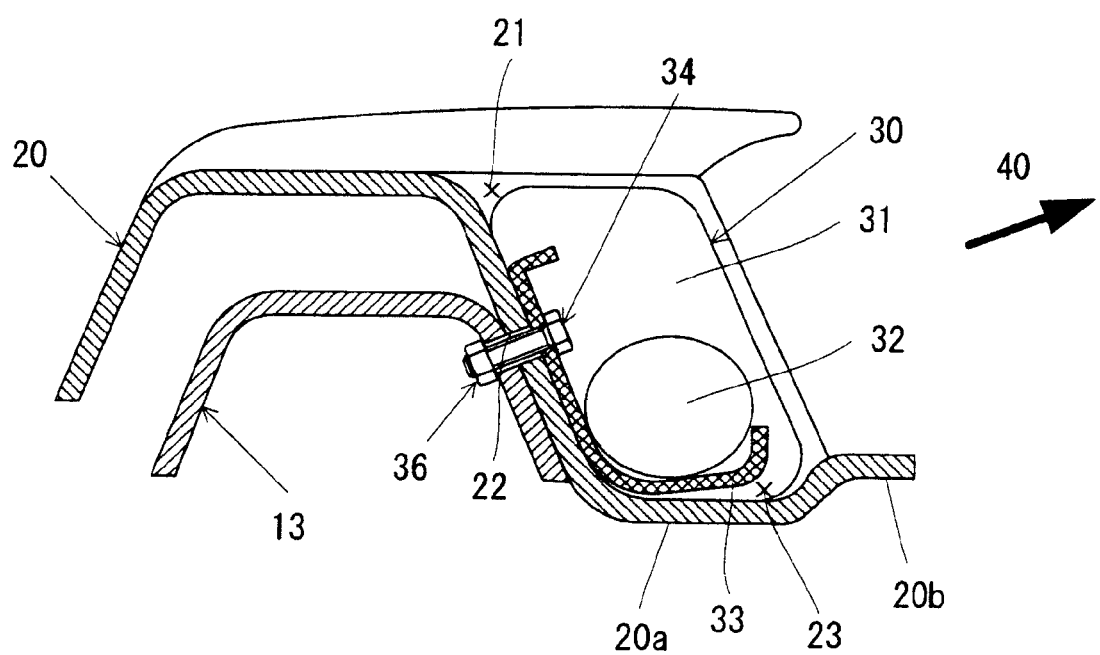
FIG. 2 is a cross-section along a line A-A in FIG. 1.

Hereinbelow, an embodiment of the present invention will be explained in detail referring to the drawings. Firstly, a construction of a vehicle seat 100 as an embodiment of a "vehicle seat" with respect to the present invention will be explained referring to FIG. 1 and FIG. 2. At this moment, FIG. 1 is a view showing an internal structure of the vehicle seat 100 according to the present embodiment, and is a perspective view looking from diagonal backside of the motor vehicle. Further, FIG. 2 is a cross-section at a line A-A in FIG. 1.

As shown in FIG. 1, the vehicle seat 100 according to the present embodiment is a vehicle seat to be mounted on a motor vehicle, and is mainly constructed of a seat frame 10, a seat pan 20, and an airbag module 30. The vehicle seat 100 is constructed to serve as a driver's seat where a driver is seated, or a passenger seat. Further, in the motor vehicle on which the vehicle seat 100 is mounted, a seatbelt (corresponds to a "seatbelt" in the present invention) to be worn by an occupant seated in the vehicle seat 100 is further mounted. Incidentally, a direction indicated by "FR" in FIG. 1 represents a front side of the motor vehicle, and that indicated by "UP" represents an upside of the motor vehicle.

The seat frame 10 is constructed to serve as a frame that forms a skeleton portion of the vehicle seat 100, and is at least provided with a base frame 12 and a back frame 14. The seat frame 10 corresponds to a "seat frame" in the present invention. On the base frame 12, a seat cushion (not shown) formed from a material having plasticity, such as a urethane material, or the like, is mounted, and the seat cushion constitutes a seat surface of the vehicle seat 100. Further, on the back frame 14, a seat back (not shown) formed from a material having plasticity, such as a urethane material, or the like, is mounted, and the seat back constitutes a back surface of the vehicle seat 100. Furthermore, an outer surface of each of the seat cushion and the back seat is covered with scurf skin (not shown) formed from leather, cloth, or the like.

The base frame 12 is a frame to be disposed below the seat cushion, and is provided with a left-and-right pair of side frames, 12a and 12b (a left side frame 12a, and a right side frame 12b), extending in a front and back direction of the vehicle seat 100 (conforming to a front and back direction of the motor vehicle). The left side frame 12a mentioned here corresponds to a "left side frame" in the present invention, and the right side frame 12b corresponds to a "right side frame" in the present invention.

Further, at an upper portion side of the base frame 12, a bracket 13 for reinforcement is provided so as to hang across the left and right side frames, 12a and 12b. The bracket 13 is constructed to be a plate shape (a curved plate shape in FIG. 1) having a predetermined board thickness, and is connected to the left and right side frames, 12a and 12b, by means of a welding process, a fastening process with a bolt and a nut, or the like. This bracket 13 serves as a supporting member for supporting the seat pan 20, and is constructed to serve as a holding member for connecting and holding the left and right side frames, 12a and 12b. In addition, the bracket 13 also serves as a positioning member when joining the left and right side frames, 12a and 12b, resulting in providing a good assembling capability. This bracket 13 corresponds to a "bracket" in the present invention.

The back frame 14 is a frame that is rotatably connected to the base frame 12 via a supporting shaft 15 and a reclining device (not shown). At an upper part of the back frame 14, a head rest 16 is attached to a position corresponding to a head portion of a vehicle occupant.

The seat pan 20 is provided so as to hang across the left-and-right pair of the side frames, 12a and 12b in a manner so as to cover the same from above, at a portion above the bracket 13 and below the seat cushion. The seat pan 20 is a member constituting a seat bottom surface of the vehicle seat 100, and specifically, can also be defined as a seat cushion panel that receives the seat cushion, a seat cushion frame, or a seat cushion board. Although described later in detail, the seat pan 20 is attached to the bracket 13 by means of the fastening process with the bolt and nut at two places. The seat pan 20 can also be joined to the left and right side frames, 12a and 12b, by means of the welding process or the fastening process with the bolt and nut. The seat pan 20 has a function to receive a load from the seat cushion. The seat pan 20 corresponds to a "seat pan" in the present invention.

Further, in the seat pan 20, a housing portion 21 for housing the airbag module 30 is provided. The housing portion 21 corresponds to an "airbag module housing portion" in the present invention. In the present embodiment, the housing portion 21 is constructed to have a hollow portion 23 (sometimes called as "concave portion", "cavity portion", or "concave area") that is downwardly hollowed. The hollow portion 23 is configured to be a portion where the airbag module 30 can be held by the hollow portion 23.

As shown in FIG. 2, the housing portion 21 is provided with a first extension portion 20a constituting a bottom surface of the hollow portion 23, and a second extension portion 20b extending to a rear side (right side in FIG. 2) in relation to the first extension portion 20a. A step portion (corresponding to a "step portion" in the present invention) is formed by means of a difference of elevation in an upper and lower direction between the first extension portion 20a and the second extension portion 20b. In concrete terms, the construction is made such that the first extension portion 20a is extending at a portion lower than the second extension portion 20b. The hollow portion 23 (first extension portion 20a) corresponds to a "hollow portion" in the present invention and an area formed by the second extension portion 20b corresponds to an "outside area" in the present invention. Further, the housing portion 21 is opened diagonally upward toward the backside. Accordingly, a developing direction (sometimes called "protruding direction") of an airbag (airbag 31 described later) of the airbag module 30 is configured to be a diagonally upward and backward direction, as a direction indicated by an arrow 40 in FIG. 2. Although described later in detail, according to a present construction, a work for housing the airbag module 30 in the housing portion 21, and a work for attaching and fixing the airbag module 30 to a seat pan 20 side is aimed at facilitating by means of a holding function (or a positioning function) of the airbag module 30 provided by the hollow portion 23 that is caved downward.

Further, according to the present construction, when the airbag module 30 is held at a proper position in the hollow portion 23, the airbag module 30 in the held condition is configured to be positioned at a front side in relation to the step portion between the first extension portion 20a and the second extension portion 20b. Accordingly, a protrusion of the airbag module 30 toward a second extension portion 20b side can be discriminated on the basis of a result of a visible confirmation between a first condition in which the airbag module 30 held by the hollow portion 23 covers the step portion and a second condition in which the covering operation is released. That is, a case, in which an entire step portion or a part of the step portion cannot be visibly confirmed, represents the first condition in which the airbag module 30 covers the step portion, and this results in that a rear end surface of the airbag module 30 is discriminated to be protruded out to the second extension portion 20b side across the step portion. At this moment, the airbag module 30 can be judged not to be located at a proper position. On the other hand, a case, in which the entire step portion can be visibly confirmed, represents the second condition in which the airbag module 30 does not cover the step portion, and this results in that the rear end surface of the airbag module 30 is discriminated not to be protruded out to the second extension portion 20b side across the step portion. At this moment, the airbag module 30 can be judged to be located at the proper position. By discriminating the protrusion of the airbag module 30 toward the second extension portion 20b side, it becomes to be enabled to prevent the airbag module 30 from being pinched by an airbag cover that covers the housing portion 21. The step portion between the first extension portion 20a and the second extension portion 20b are configured to be a mechanism in which the protrusion of the airbag module 30 toward the second extension portion 20b can be discriminated, and constitute a "discriminating mechanism" in the present invention. With regard to visibility of the step portion, the visibility of the step portion can be aimed at being further improved by forming a colored line at the step portion.

Incidentally, the housing portion 21 of the seat pan 20 in the present embodiment has a construction including a hollow portion 23 that is caved downward. Therefore, the airbag module 30 in the housed condition (non-operating time) is aimed at being protected. Further, an airbag cover (not shown) that covers the housing portion 21 in a condition, in which the airbag module 30 is housed therein, is mounted on the seat pan 20, and protection for the airbag module 30 in the condition being housed by the airbag cover is aimed at being further improved.

As shown in FIG. 2, the airbag module 30 at least includes an airbag 31, a gas generator (sometimes called as, inflator) 32, and a retainer 33. The airbag module 30 corresponds to an "airbag module" in the present invention.

The airbag 31 is constructed as an airbag element that is folded back in a predetermined folding configuration and housed, and that is developed and expanded by gas generated by the gas generator 32 and supplied to the airbag element when an accident occurs. In concrete terms, the airbag 31 is developed and expanded from a downside to an upside of a seat cushion against movement of a vehicle occupant toward a front side of the motor vehicle in a seating condition of the vehicle occupant in a vehicle seat when the accident occurs. Thereby, in a seatbelt-wearing condition in which a seatbelt is worn by a vehicle occupant seated in a vehicle seat 100, a phenomenon, i.e., a so-called submarine phenomenon, in which the vehicle occupant has a behavior to slip through a downside of a seatbelt along a seat surface, along with a frontward movement of a waist portion of the vehicle occupant when the accident occurs, is blocked or suppressed. The airbag 31 mentioned here corresponds to an "airbag" in the present invention, and a "gas-supplying portion" in the present invention is constructed by the gas generator 32.

The retainer 33 is constructed to serve as a member for housing the gas generator 32. The retainer 33 corresponds to a "retainer" in the present invention. A fixing bolt 34 for attaching and fixing the airbag module 30 to the base frame 12 side is provided in the retainer 33. The airbag module 30 is attached and fixed to the base frame 12 side by means of the fixing bolt 34. In concrete terms, the fixing bolt 34 is configured to be able to be inserted into a through-hole 22 penetrating through the seat pan 20 and the bracket 13 in a condition in which the airbag module 30 is housed in the housing portion 21 of the seat pan 20. Accordingly, three members of the retainer 33, the seat pan 20, and the bracket 13 are integrally formed by being fixed to each other by being fastened together (sometimes called as "fixing by together-fastening") by fastening (screwing) the fixing bolt 34 penetrated through the through-hole 22, and the nut 36 with each other. In this case, the nut 36 may be constructed as a separate body from the bracket 13, or may have a construction in which the nut 36 is integrally jointed with the bracket 13. The nut 36 is a member to be fastened to the fixing bolt 34, and constitutes a "to-be-fixed portion" in the present invention. Further, a shape of a round hole, a long hole, a slit, or the like can appropriately be selected as the through-hole 22. The fixing bolt 34 mentioned here corresponds to a "fixing member" and a "fixing bolt" in the present invention.

Incidentally, the present embodiment is constructed such that an extending direction of a bolt axis of the fixing bolt 34 is approximately conformed to a developing direction of the airbag 31 along a direction indicated by an arrow 40 in FIG. 2. According to such a construction, it is enabled that fastening force of the fixing bolt 34 is effectively used as force against an airbag load when the airbag is developed and expanded.

A work for housing the airbag module 30 in the present embodiment in the housing portion 21 of the seat pan 20, and a work for attaching and fixing the airbag module 30 to the seat pan 20 side will be explained referring to FIGS. 3 through 6.

Figure 3:
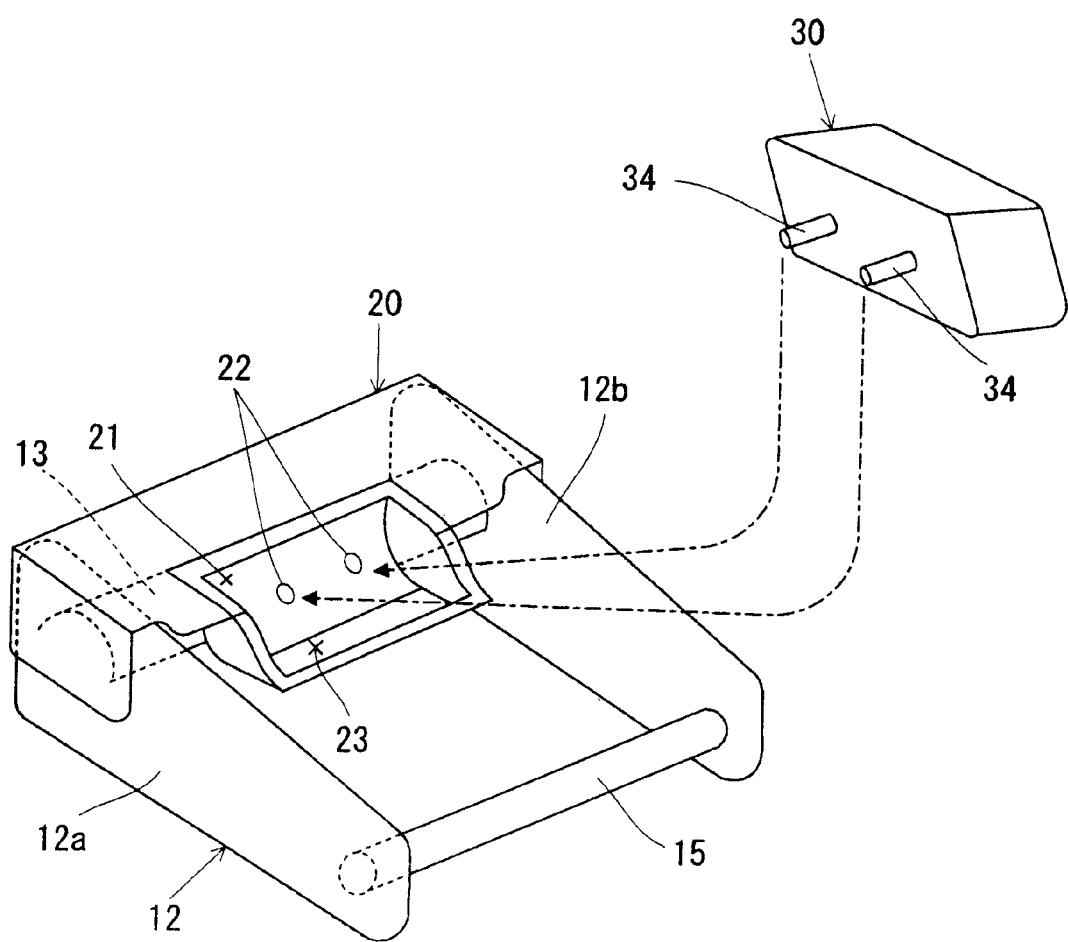
FIG. 3 is a perspective view schematically showing a work for housing an airbag module 30 into a housing portion 21 of a seat pan 20.

FIG. 3 is a perspective view schematically showing the work for housing the airbag module 30 into the housing portion 21 of the seat pan 20. As shown in FIG. 3, in the housing work for the airbag module 30, firstly, the airbag module 30 is moved to the housing portion 21 in a manner so as for the fixing bolt 34 at an airbag module 30 side to be headed to the housing portion 21 of the seat pan 20.

Figure 4:
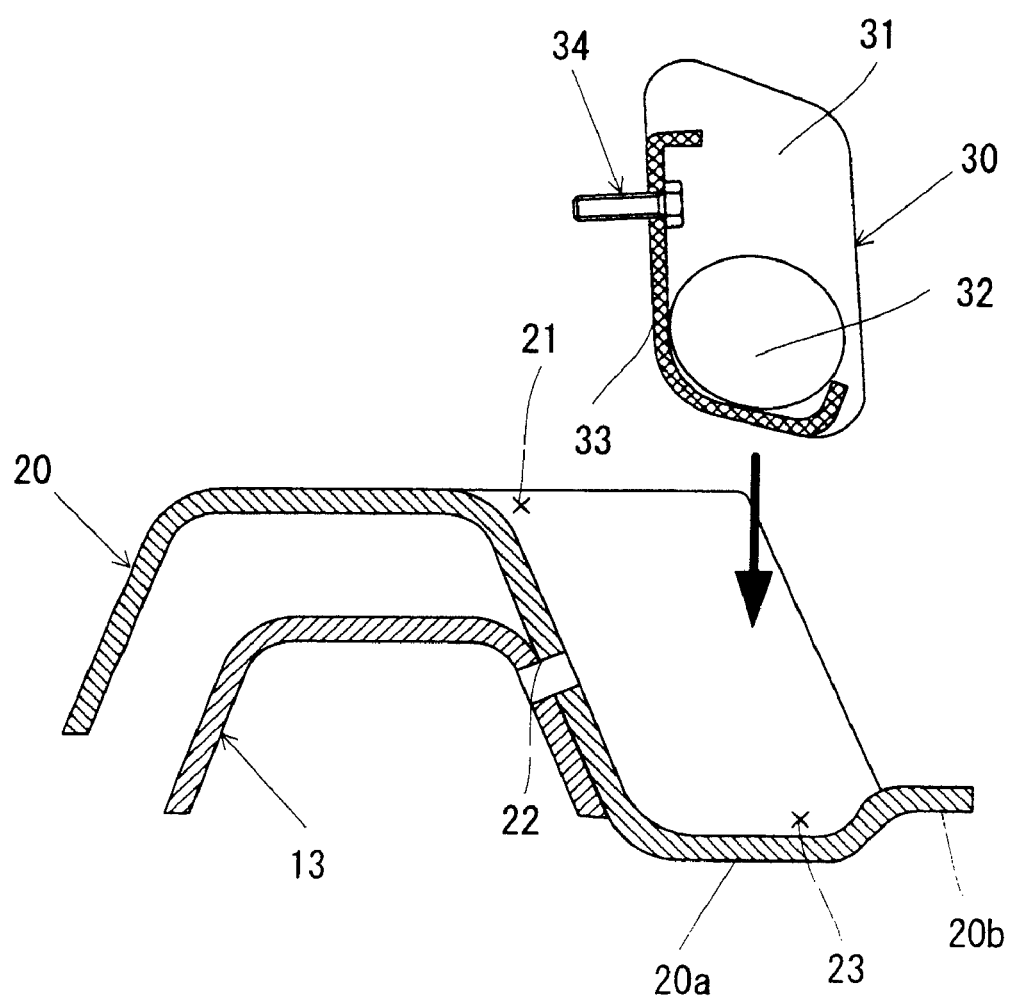
FIG. 4 is a cross-section showing a process for attaching and fixing the airbag module 30 into the housing portion 21 of the seat pan 20.
Figure 5:
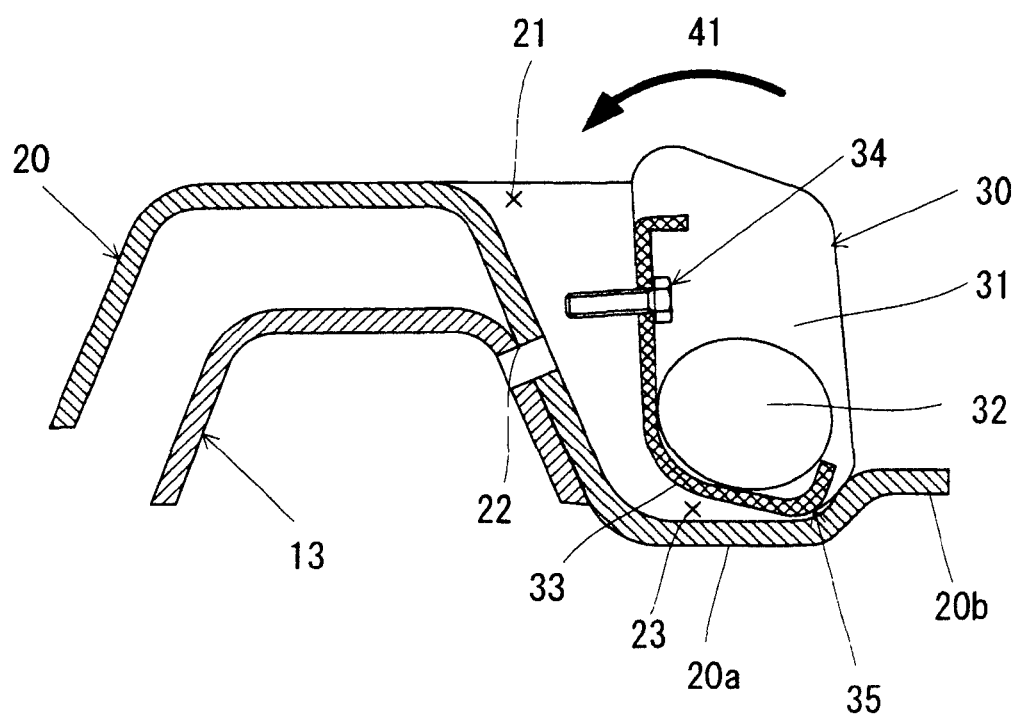
FIG. 5 is a cross-section showing a process for attaching and fixing the airbag module 30 into the housing portion 21 of the seat pan 20.
Figure 6:
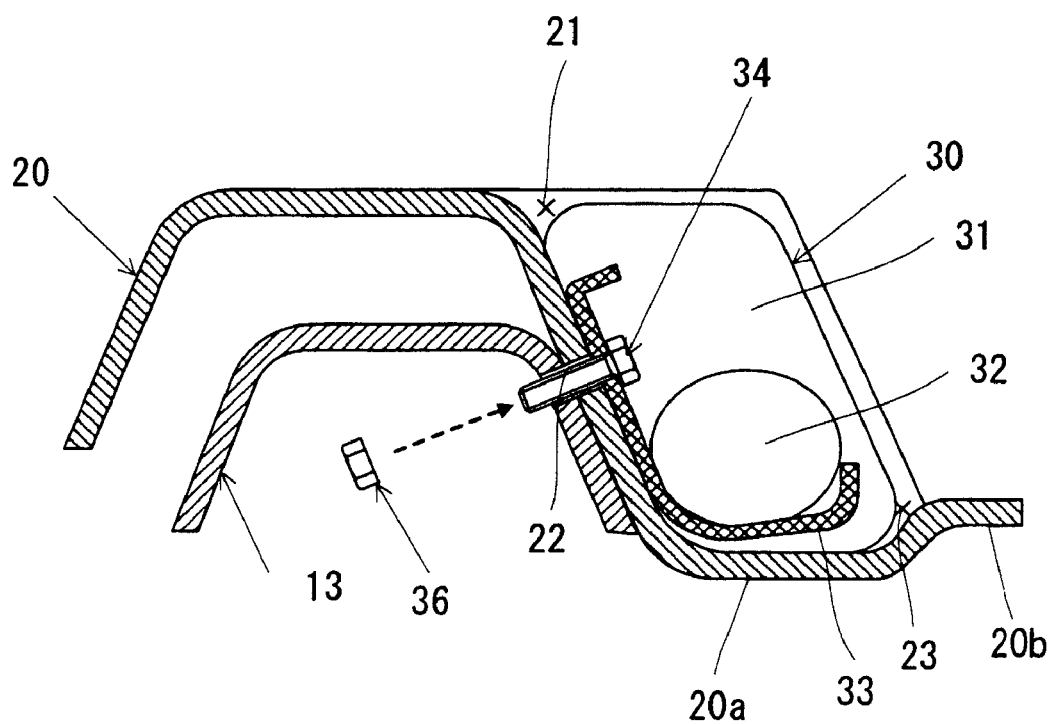
FIG. 6 is a cross-section showing the process for attaching and fixing the airbag module 30 into the housing portion 21 of the seat pan 20.

Continuously, with regard to the work until the airbag module 30 is attached and fixed to the seat pan 20 side, the same can be performed by at least using, for example, three steps shown in FIG. 4 through FIG. 6. At this moment, any of FIG. 4 through FIG. 6 is a cross-section showing a process for attaching and fixing the airbag module 30 to the housing portion 21 of the seat pan 20.

As shown in FIG. 4, in the first step, the airbag module 30 is inserted toward the hollow portion 23 (the first extension portion 20a) from above the seat pan 20, in a condition of being headed so as for a gas generator 32 side to be situated at a downside. Thereby, a provisionally held condition of the airbag module 30 shown in FIG. 5 is formed. At this moment, the bolt axis of the fixing bolt 34 is extended approximately in a left-and-right direction.

Next, as shown in FIG. 5, in the second step, the airbag module 30 is rotated in a direction indicated by an arrow 41 in FIG. 5 around the step portion as a pivot fulcrum, in a condition in which a module lower portion 35 of the airbag module 30 in a provisionally held condition is in contact with the step portion between the first extension portion 20a and the second extension portion 20b. Further, the fixing hole 34 is caused to be in close contact with the through-hole 22 by the rotation. Thereby, an inserting condition where the fixing bolt 34 is inserted into the through-hole 22 is formed, as shown in FIG. 6. In consideration of ease of insertion for the fixing bolt 34, it is preferable to use an elongate hole extending in an upper and lower direction, as the through-hole 22.

At the last, as shown in FIG. 6, in the third step, by fastening the fixing bolt 34 and the nut 36 with each other, an integrally formed condition (the condition shown in FIG. 2) where the retainer 33, the seat pan 20, and the bracket 13 are fastened and fixed to each other, is formed. At this moment, the airbag module 30, the seat pan 20 and the bracket 13 are fastened together and fixed by the fixing bolt 34, whereby pressure caused at the time when the airbag 31 is developed and expanded when the accident occurs, namely a load generated when the airbag module 30 is operated is to be received by the seat pan 20 and the bracket 13 that are integrally formed by being fastened and fixed together.

At this moment, since strength of the seat pan 20 can be raised by means of that a board thickness of the bracket 13 that is fastened and fixed together to the seat pan 20 is added to a board thickness of the seat pan 20, it is enabled that the strength required for the vehicle seat 100 is secured, upon suppressing the board thickness of the seat pan 20 in this extent. That is, the strength of the vehicle seat 100 can be secured while aiming at weight saving for the vehicle seat 100 by means of a cooperative work among the retainer 33, the seat pan 20, and the bracket 13. Incidentally, in a case that a specification, in which the board thickness of the seat pan 20 is suppressed, is considered, with regard to a board thickness, d1, of the seat pan 20, and a board thickness, d2, of the bracket 13, it is preferable to set the same on the basis of a relationship expressed by an inequality, $d1 \leq d2$.

Further, occurrence of an abnormal noise due to contact or the like of the seat pan 20 and the bracket 13 can be prevented by fastening and fixing together, and seating comfortableness of the vehicle seat 100 can be improved by raising the strength of the seat pan 20.

Furthermore, since the seat pan 20 is constructed to be fixed to the bracket 13 by together fastening and fixing, and the seat pan 20 is not required to be fixed to the left side frame 12a and the right side frame 12b by welding or the like, a manufacturing process of the vehicle seat 100 can be simplified.

By performing the aforementioned first to the third steps in the order, the work for attaching and fixing the airbag module 30 to the seat pan 20 side is facilitated. Specifically, in the second and third steps, the module lower portion 35 of the airbag module 30 held by the hollow portion 23 is caused to come into contact with the step portion between the first extension portion 20a and the second extension portion 20b from beginning to end during the time until the airbag module 30 is fastened to the seat pan 20 side by means of the fixing bolt 34. Since the airbag module 30 is thereby positioned, it is enabled to aim at improving an assembling capability of the airbag module 30.

Incidentally, the present invention is not limited to the aforementioned embodiment, and various applications and modifications are considered. For example, the following each embodiment, to which the aforementioned embodiment is applied, can be performed.

In the seat pan 20 in the aforementioned embodiment, although the case that the housing portion 21 that houses the airbag module 30 is opened diagonally upward toward the backside is described, the construction of the seat pan in the present invention can appropriately be changed as needed. For example, each embodiment shown in FIG. 7 through FIG. 9 can also be adopted.

Figure 7:
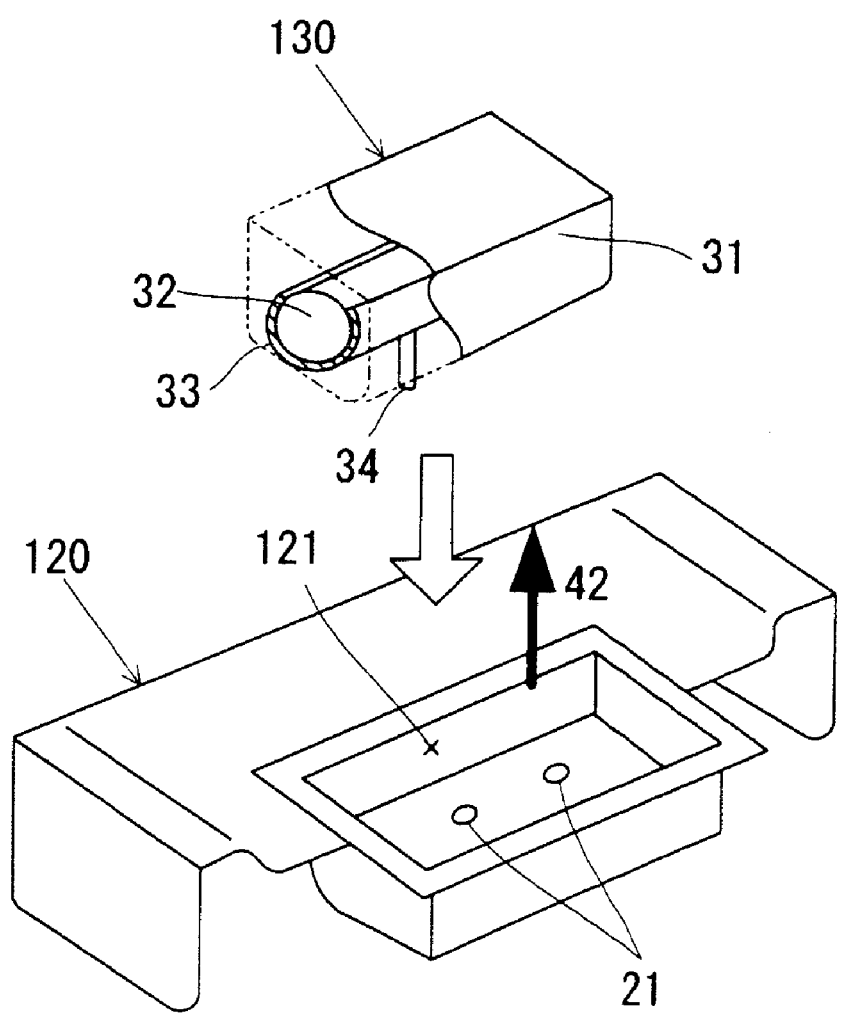
FIG. 7 is a perspective view showing a construction of a seat pan 120 and an airbag module 130 in another embodiment.

FIG. 7 is a perspective view showing a construction of a seat pan 120 and an airbag module 130 in another embodiment.

In the seat pan 120 in the embodiment shown in FIG. 7, a housing portion 121 that houses the airbag module 130 is constructed to open upward. In the airbag module 130 housed in the housing portion 121, the fixing bolt 34 is attached to a lower portion of the retainer 33. Accordingly, the airbag module 130 is inserted from above the housing portion 121 in a condition in which the fixing bolt 34 is facing downward, and the fixing bolt 34 is inserted into the through-hole 22 and fastened. Thereby, the airbag module 130 is attached to a seat pan 120 side and fixed thereto. In the airbag module 130, a developing direction of the airbag 31 that is developed and expanded when the accident occurs is an upside of the motor vehicle as shown by an arrow 42 in FIG. 7, and this direction is approximately conformed to an extending direction of the bolt axis of the fixing bolt 34.

Figure 8:
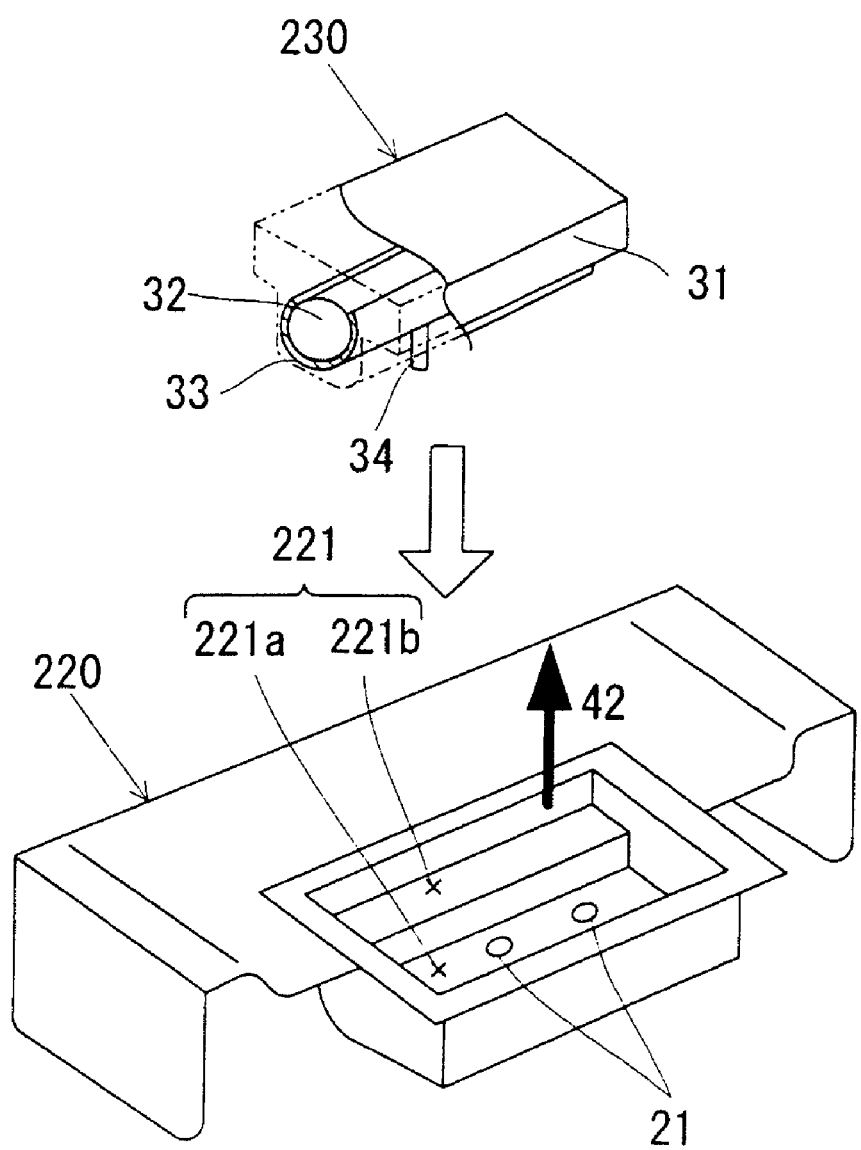
FIG. 8 is a perspective view showing a construction of a seat pan 220 and an airbag module 230 in still another embodiment.

Further, FIG. 8 is a perspective view showing a construction of a seat pan 220 and an airbag module 230 in still another embodiment.

In the seat pan 220 in the embodiment shown in FIG. 8, a housing portion 221 that houses the airbag module 230 is constructed to open upward. The housing portion 221 is configured to have a stepped structure where a difference of elevation is applied to, in relation to an upper and lower direction, and a position that is relatively deep in depth is configured to be a first housing area 221a for housing the retainer 33, and a position relatively shallow in depth is configured to be a second housing area 221b for housing the portion of the airbag 31 situated above the retainer 33 in relation to the retainer 33. In the airbag module 230 housed in the housing portion 221, the fixing bolt 34 is attached to the lower portion of the retainer 33. Accordingly, the airbag module 230 is inserted from above the housing portion 221 in the condition in which the fixing bolt 34 is facing downward, and the fixing bolt 34 is inserted into the through-hole 22 and fastened. Thereby, the airbag module 230 is attached to a seat pan 220 side and fixed thereto. In the airbag module 230, a developing direction of the airbag 31 that is developed and expanded when the accident occurs is an upside of the motor vehicle as shown by an arrow 42 in FIG. 8, and this direction is approximately conformed to an extending direction of the bolt axis of the fixing bolt 34.

Figure 9:
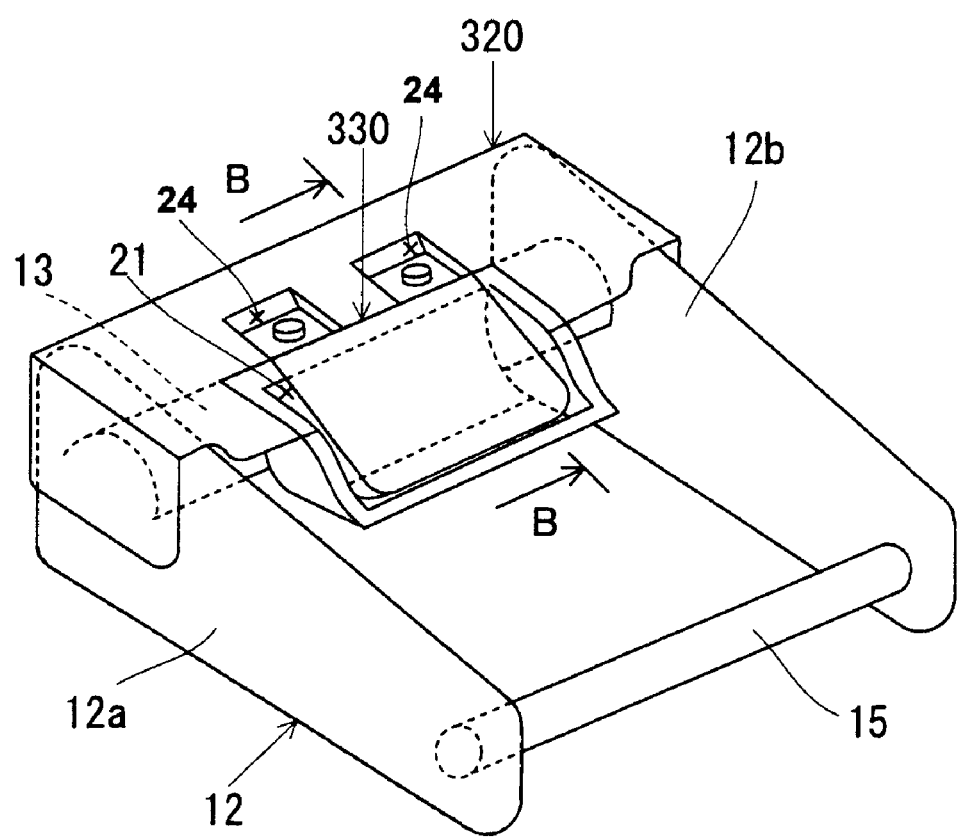
FIG. 9 is a perspective view showing a construction of a seat pan 320 and an airbag module 330 in a further embodiment.
Figure 10:
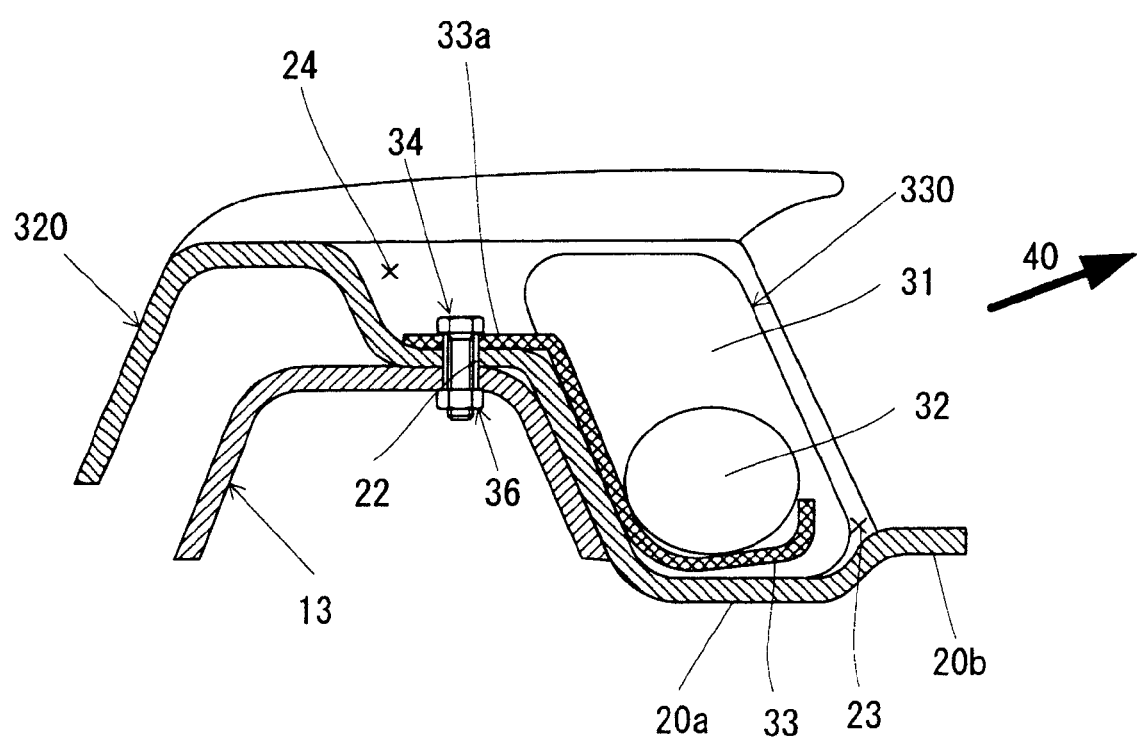
FIG. 10 is a cross-section along a line B-B in FIG. 9.

Furthermore, FIG. 9 is a perspective view showing a construction of a seat pan 320 and an airbag module 330 in a further embodiment, and FIG. 10 is a cross-section along a line B-B in FIG. 9.

Figure 11:
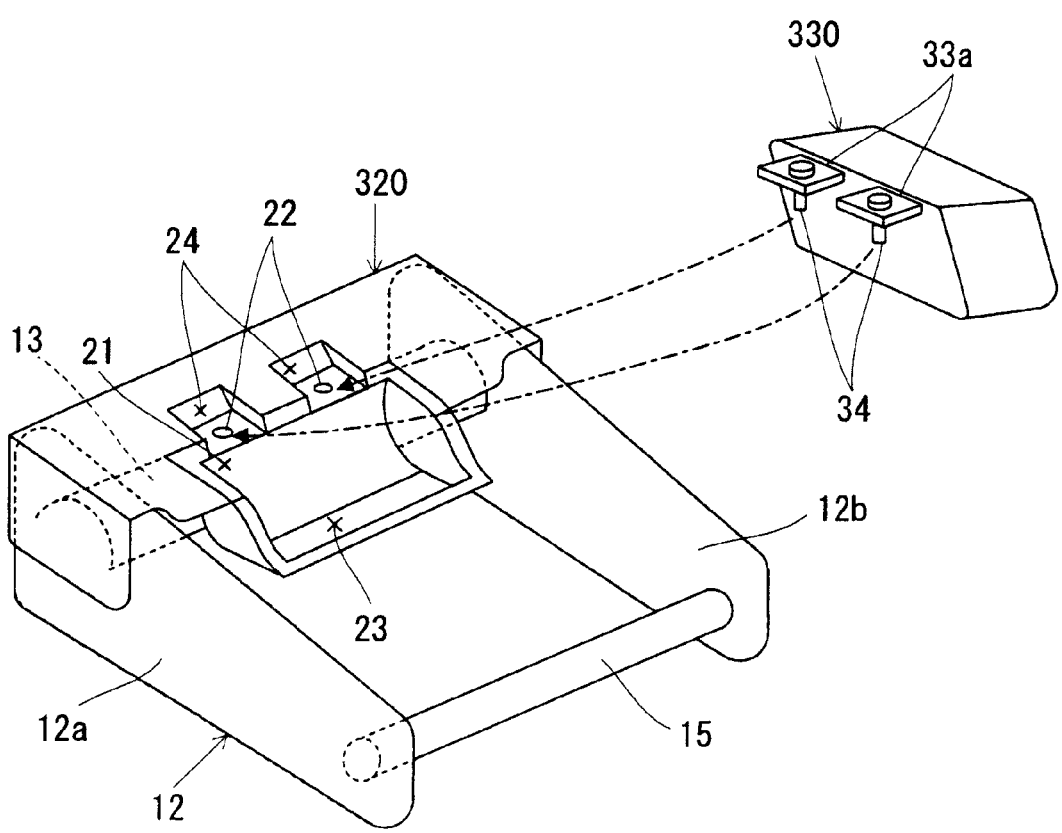
FIG. 11 is a perspective view schematically showing a work for housing the airbag module 330 into the housing portion 21 of the seat pan 320.

The seat pan 320 in the embodiment shown in FIG. 9 is provided with the housing portion 21 similar to that in the seat pan 20, and the seat pan 320 is constructed to be further provided with a left-and-right pair of housing portions, 24 and 24. On the other hand, as shown in FIGS. 10 and 11, in the airbag module 330 that is housed in the housing portion 21, a left-and-right pair of brackets 33a for bolts 34 are provided in the retainer 33. Each bracket for bolt 33a is fastened together and fixed to the seat pan 320 and the bracket 13 by means of the fixing bolt 34 and the nut 36 in a condition of being housed in each housing portion 24. In the airbag module 330, a developing direction of the airbag 31 that is developed and expanded when the accident occurs is configured to be a diagonally upward toward the backside direction as shown by an arrow 40 in FIG. 10, similar to that of a case of the airbag module 30.

At this moment, FIG. 11 is a perspective view schematically showing a work for housing the airbag module 330 into the housing portion 21 of the seat pan 320. As shown in FIG. 11, in the housing work for housing the airbag module 330, firstly, the airbag module 330 is moved to the housing portion 21 in a manner so as for the fixing bolt 34 at the airbag module 330 side to be headed toward the housing portion 24 of the seat pan 320. Then, after inserting the fixing bolt 34 into the through-hole 22 that penetrates the seat pan 320 and the bracket 13, the fixing bolt 34 and the nut 36 are fastened to each other. Thereby, a condition, in which the retainer 33, the seat pan 320, and the bracket 13 are fastened together and fixed, is formed.

Further, in the aforementioned embodiment, although the bracket 13 constructed to be a plate shape having a predetermined board thickness (curved plate shape in FIG. 1) is described, a structure of a member corresponding to the bracket 13 is not limited thereto, and is able to be changed into various types of the bracket as needed. In concrete terms, a construction member in which a through-hole for together-fastening is formed in a member, in which a cylindrically formed pipe-shaped member is pressed into a flat plate shape, a construction member in which a through-hole for together-fastening is formed in a plate-shaped member hung across a plurality of pipe-shaped member, a construction member in which a through-hole for together-fastening is formed in a member that is squeezed into a box-shape, or formed into a box-shape by bending processing, and so forth can also be used as a substitute member for the bracket 13.

Furthermore, in the aforementioned embodiment, although a case, in which the pressure caused at the time when the airbag is developed and expanded is extended into the bracket 13 fastened together and fixed to the seat pan 20 from the hollow portion 23 of the seat pan 20 is described, in the present invention, with regard to a relative relationship between the hollow portion 23 of the seat pan 20 and the bracket 13, another construction can also be adopted. For example, a construction, in which the pressure caused at the time when the airbag is developed and expanded is extended into the bracket by that the hollow portion in a condition of being spaced apart from the bracket comes into contact with the bracket at the time when the airbag is developed and expanded, or a construction, in which the pressure caused at the time when the airbag is developed and expanded is extended into the bracket by means of that the hollow portion in a condition of being in contact with the bracket in a non-jointing state presses the bracket at the time when the airbag is developed and expanded, can also adopted.

Moreover, in the aforementioned embodiment, although a construction of the vehicle seat 100 that is constructed as a driver's seat in which a driver is seated, or a passenger seat is explained, the characteristic part of the present invention can also be applied to a construction of various types of vehicle seats including the driver's seat or a passenger seat, for example, a rear seat. In the motor vehicle in this case, various types of motor vehicles moving with vehicle occupants taken on, such as automobiles, airplanes, boats and ships, electric trains, buses, trucks, and so forth are included.

What is claimed is:

1. An airbag device for a vehicle seat, the airbag device comprising:
   a seat pan of the vehicle seat for supporting a seat cushion thereon;
   an airbag module including a retainer and an airbag; and
   a concave recessed portion of the seat pan for receiving the airbag module therein with deployment of the airbag lifting the seat cushion, wherein the retainer includes a substantially flat bottom portion and an inclined portion extending up at an incline from the flat bottom portion, and the concave recessed portion of the seat pan includes a flat bottom portion substantially corresponding to the retainer flat bottom portion, and an inclined portion extending up at an incline from the flat bottom portion substantially corresponding to the retainer inclined portion for being engaged thereagainst to be secured thereto.

2. The airbag device of claim 1 wherein the concave recessed portion of the seat pan includes a step portion that provides for ease in locating the airbag module in the concave recessed portion.

3. The airbag device of claim 2 wherein the step portion is at one end of the concave recessed portion and the inclined portion of the concave recessed portion comprises a wall that extends generally upwardly at an opposite end of the concave recessed portion to allow the airbag module to be pivoted at the step portion toward the wall for assembly of the airbag module in the concave recessed portion of the seat pan.

4. The airbag device of claim 3 wherein the wall of the concave recessed portion includes an aperture for receiving a fastener therethrough with the airbag module pivoted thereagainst for fixing the airbag module thereto.

5. The airbag device of claim 1 wherein the inclined portion of the concave recessed portion includes a wall portion against which the airbag module is engaged at one side thereof, and
   a support member at the other side of the wall portion to support the wall portion during airbag deployment.

6. An airbag device for a vehicle seat, the airbag device comprising:
   a seat pan of the vehicle seat for supporting a seat cushion thereon;
   an airbag module including an airbag;
   a concave recessed portion of the seat pan for receiving the airbag module therein with deployment of the airbag lifting the seat cushion, wherein the concave recessed portion includes a wall portion against which the airbag module is engaged at one side thereof; and
   a support member at the other side of the wall portion to support the wall portion during airbag deployment, wherein the airbag module and support member are fastened against the respective sides of the wall portion via a fastener.

7. A vehicle seat comprising:
   a seat pan for supporting a cushion;
   an airbag module including a retainer and an airbag;
   a housing portion of the seat pan configured for receiving the airbag module therein; and
   a discriminating mechanism of the seat pan housing portion that provides a visual indication of whether the airbag module is in proper position received in the housing portion, wherein the housing portion is a concave portion of the seat pan, and the discriminating mechanism is a step portion at one end of the concave portion, the concave portion having an upwardly extending wall portion at an end opposite to the one end thereof and a bottom extending between the opposite ends, and the retainer includes an upwardly extending portion that is engaged and secured against the upwardly extending wall portion.

8. The vehicle seat of claim 7 wherein the concave portion includes a generally flat bottom wall portion with the step portion being at a rear end of the flat bottom wall portion, and the upwardly extending wall portion being at a forward end of the flat bottom wall portion and sized and configured so that the concave portion generally opens rearwardly and obliquely relative to the flat bottom wall portion.

9. The vehicle seat of claim 7 including a bracket member positioned so that the upwardly extending wall portion is between the retainer upwardly extending portion and the bracket member with the bracket member providing support to the upwardly extending wall portion during airbag deployment.

10. The vehicle seat of claim 7 wherein the retainer upwardly extending portion carries an elongate fastener, and the upwardly extending wall portion has an opening therethrough that is elongated in a generally upward direction to provide clearance for the elongate fastener to be pivoted into the opening to extend therethrough for fastening the retainer upwardly extending portion to the seat pan upwardly extending wall portion.

11. A vehicle seat comprising:
a seat pan for supporting a cushion;
an airbag module including an airbag;
a housing portion of the seat pan configured for receiving the airbag module therein;
a discriminating mechanism of the seat pan housing portion that provides a visual indication of whether the airbag module is in proper position received in the housing portion, wherein the airbag module includes a retainer, and both the housing portion and the retainer include corresponding upwardly extending forward portions;
a fastener for securing the forward portions together; and
a bracket member positioned so that the housing forward portion is between the retainer forward portion and the bracket member, wherein the bracket member is engaged against the housing forward portion and secured thereto by the fastener.

12. A method of installing an airbag module, the method comprising:

lowering the airbag module toward an airbag module mounting location of a seat pan;
determining whether a predetermined discriminating portion of the seat pan is visible with the airbag module on the seat pan;
readjusting the airbag module if the seat pan discriminating portion is not visible to position the airbag module at the seat pan mounting location;
shifting the airbag module in a predetermined manner relative to the seat pan discriminating portion with the seat pan discriminating portion visible and the airbag module positioned at the seat pan mounting location to bring predetermined mounting portions of the airbag module and seat pan into engagement; and
fastening the airbag module and seat pan mounting portions together, wherein the seat pan discriminating portion is a step portion and the airbag module is shifted by pivoting the airbag module with the step portion acting as a fulcrum during pivoting of the airbag module, and wherein the seat pan mounting portion is an inclined wall portion, the airbag module mounting portion is a portion of a retainer, and the airbag module is pivoted by pivoting the retainer portion of the module into engagement with the inclined wall portion of the seat pan, and the inclined wall and retainer portions are fastened together by advancing a fastener carried by the retainer portion through an aperture in the inclined wall portion as the airbag module is pivoted to bring the retainer and inclined wall portions into engagement with each other.

13. The method of claim 12 wherein the fastener is advanced through an aperture in the inclined wall portion by forming the aperture to be elongated generally upwardly in the inclined wall portion so that the elongated aperture provides clearance for introducing the fastener therein during pivoting of the airbag module to bring the retainer and inclined wall portions into engagement with each other.

* * * * *